(12) United States Patent
Navani et al.

(10) Patent No.: US 10,126,993 B2
(45) Date of Patent: Nov. 13, 2018

(54) ROUTING OUTPUTS FROM JOBS SUBMITTED ON A MAINFRAME SYSTEM

(71) Applicant: CA, Inc., New York, NY (US)

(72) Inventors: Richa Navani, Hicksville, NY (US); Ravish M. Parikh, Hicksville, NY (US)

(73) Assignee: CA, Inc., New York, NY (US)

( * ) Notice: Subject to any disclaimer, the term of this patent is extended or adjusted under 35 U.S.C. 154(b) by 0 days.

(21) Appl. No.: 14/794,179

(22) Filed: Jul. 8, 2015

(65) Prior Publication Data

US 2017/0010843 A1    Jan. 12, 2017

(51) Int. Cl.
G06F 3/12 (2006.01)
H04N 1/00 (2006.01)

(52) U.S. Cl.
CPC ............ *G06F 3/1256* (2013.01); *G06F 3/126* (2013.01); *G06F 3/1207* (2013.01); *G06F 3/1285* (2013.01); *G06F 3/1292* (2013.01); *H04N 1/00212* (2013.01)

(58) Field of Classification Search
CPC .................................................. H04N 1/32122
See application file for complete search history.

(56) References Cited

U.S. PATENT DOCUMENTS

| | | | |
|---|---|---|---|
| 2010/0144312 A1* | 6/2010 | Runstedler ............ | H04M 15/00 455/407 |
| 2013/0070280 A1* | 3/2013 | Hosoda .............. | G06K 15/1817 358/1.14 |
| 2014/0168698 A1* | 6/2014 | Okada ................... | G06F 3/1236 358/1.15 |
| 2015/0215481 A1* | 7/2015 | Faust ................. | H04N 1/00225 358/1.13 |

OTHER PUBLICATIONS

G. Bernbom, et al.: "Security in a Client/Server Environment", Cause/Effect vol. 17, No. 4, Winter 1994.*

* cited by examiner

*Primary Examiner* — Peter K Huntsinger
(74) *Attorney, Agent, or Firm* — Meyertons, Hood, Kivlin, Kowert & Goetzel, P.C.

(57) ABSTRACT

According to aspects of the present invention, a method, system, and computer-readable hardware for routing outputs of jobs performed on a mainframe comprises transmitting a list of completed jobs to a graphic user interface (GUI). A selection of a job from the list of jobs is received, and a list of outputs associated with the selected job is transmitted to the GUI. A selection of an output from the list of outputs and forwarding parameters associated with the selected output are received. The forwarding parameters include a recipient and a message type. Based on the selected output and the message type identified in the forwarding parameters, a message is created. The message is sent for delivery to the recipient.

20 Claims, 4 Drawing Sheets

ROUTING OUTPUTS FROM JOBS SUBMITTED ON A MAINFRAME SYSTEM

BACKGROUND

Various aspects of the present disclosure relate generally to mainframe systems and specifically to the technological field of analyzing results of jobs run on a mainframe system.

In a mainframe system, multiple users can time-share the processing time of the system. For example, a user may use a TPX (terminal productivity executive) emulator to log onto the mainframe system and submit a job (i.e., a script) for execution. That job is then placed in a queue while other jobs are being processed. When the mainframe system completes the other jobs in the queue that were entered before the job, then the job is processed. When the job is completed, any outputs generated by the job are placed in an output queue for printing (storage in memory), and the job is appended to a list of completed jobs.

In some instances, a job may include a NOTIFY command that sends a notification to a user that the job has completed. Once the notification is received, the user can log onto the mainframe system through the TPX emulator to view the outputs created during execution of the job.

BRIEF SUMMARY

According to aspects of the present disclosure, a method, system, and computer-readable hardware for routing outputs of jobs performed on a mainframe comprises transmitting a list of completed jobs to a graphic user interface (GUI). A selection of a job from the list of jobs is received, and a list of outputs associated with the selected job is transmitted to the GUI. A selection of an output from the list of outputs and forwarding parameters associated with the selected output are received. The forwarding parameters include a recipient and a message type. Based on the selected output and the message type identified in the forwarding parameters, a message is created. The message is sent for delivery to the recipient.

DETAILED DESCRIPTION

According to aspects of the present disclosure, an interface allows a user to locate outputs of completed jobs and send those outputs to recipients, so that the recipients may analyze the outputs. For example, the user may use a mobile device (e.g., a smartphone, a tablet, etc.) to log onto a mainframe system to choose a completed job. Once the job is chosen, the user may choose one or more of the outputs, assign recipients (i.e., devices that will receive a message created from the selected output) for those outputs, and assign a message type (e.g., e-mail, popup window, text file, etc.). The system then converts the output into a format suitable for the message type and sends the converted output into the assigned recipients. Then, a person with access to the recipient may analyze the converted output without logging onto the mainframe system.

Figure 1:
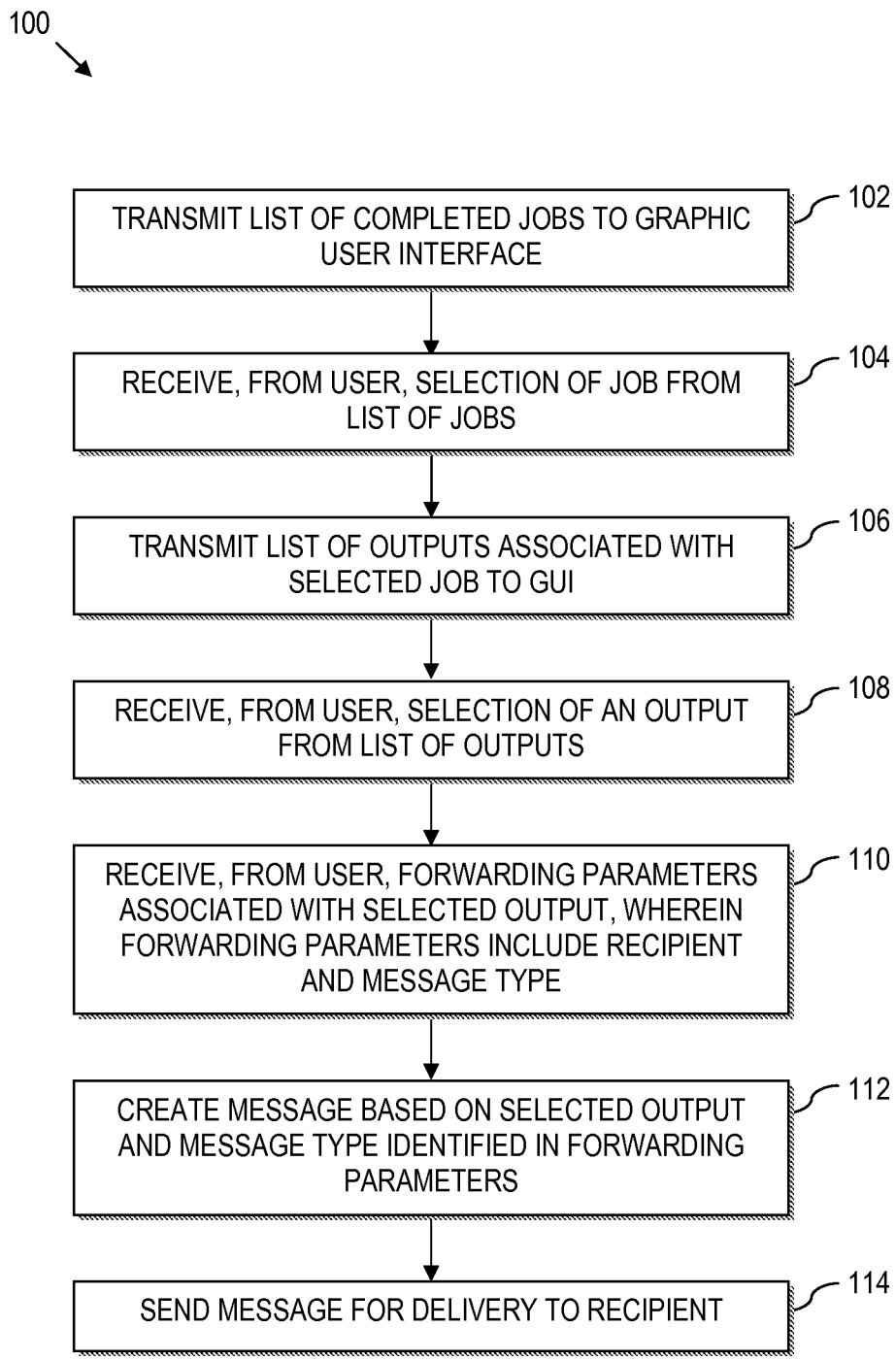
FIG. 1 is a flow chart illustrating a method for routing outputs of batch jobs processed on a mainframe, according to various aspects of the present disclosure.

Referring to drawings, and in particular to FIG. 1, a method 100 for routing outputs of batch jobs processed on a mainframe is disclosed, wherein the method may be executed on a computer system. In this regard, the method 100 may be implemented on computer-readable hardware that stores machine-executable program code, where the program code instructs a processor to implement the described method. The method 100 may also be executed by a processor coupled to memory, where the processor is programmed by program code stored in the memory, to perform the described method.

At 102, a list of completed jobs is transmitted to a graphical user interface (GUI) of a device. As mentioned above, when jobs are executed on a mainframe system, a record is kept of the completed jobs, and that record is transmitted to a GUI. However, it is not necessary for the entire list to be sent to the GUI. For example, if a user provides credentials (e.g., identification and password), then the list may be filtered such that only jobs associated with that user are sent to the GUI.

Further, the GUI may be associated with any device. For example, the GUI may be directly coupled to the system that is running the method 100 (e.g., a monitor of a computer of the system) or may be remote to the system running the method 100 (e.g., a mobile device such as a tablet, smartphone, etc.), but communicating with the system via a wired or wireless network. Moreover, the GUI may be any GUI. For example, the GUI may create a dropdown menu that has a list of all of the jobs available to the user. As another example, the jobs may be listed as hyperlinks or require radio buttons for selection.

At 104, a selection of one of the jobs presented in the list is received. The user may select any of the presented jobs via the GUI, and that selection is received by the system running the method. For example, if the jobs are listed in a dropdown menu, then the user may click on the desired job, and that selection is received through the wireless network. As another example, if the GUI includes a webpage with hyperlinks indicating the jobs available to the user, then the user may click on the hyperlink. The selection received does not need to match the name of the job exactly. Instead, there may be a mapping between the selection received and the name of the actual job name. For example, if the list is presented to the user in a dropdown menu and the user selects JOB_X, which is the fourth job in the dropdown menu, then the selection received may be POSITION_4, and the system running the method may map POSITION_4 to JOB_X. If such mapping is used, then the mapping may be performed by the system running the method, some other system, or both.

At 106, a list of outputs associated with the selected job is transmitted to the GUI. As mentioned above, each completed job may have one or more outputs. Once the user makes a job selection, the outputs associated with the selected job are transmitted to the GUI for display.

At 108, a selection of an output is received from the user, and at 110, forwarding parameters are received from the user. Basically, the user selects which outputs should be sent, recipients for the outputs, and a message type for the output. For example, if a completed job has three outputs, then a user can pick one of the outputs and chooses any number of people to receive the output. Recipients may be defined as a person or a device. For example, instead of listing a person as the recipient, that person's tablet name, mobile phone name, desktop name, e-mail address, etc. may be used.

Moreover, the recipient for an output may include more than one recipient. For example, when an output is selected, the user may enter in a list of recipients. Each listed recipient may include a separate message type, or the same message type may be used for all recipients.

Further, the user selects a method of delivery (i.e., a message type) for the output. For example, the output may be delivered as a popup window, a text file sent to the recipient, an e-mail sent to the recipient, etc. Each recipient may also have a default/preferred method of delivery. As such, when the user selects the recipients, the message type may automatically be populated from a table including the preferred message type for that recipient. The user may then override the preferred message type or allow the default message type to be selected. Also, each recipient is not limited to one message type for delivery. Instead, the forwarding parameters may include multiple message types for a single recipient.

The recipients and message types may be assigned to one or more outputs. For example, if two outputs are to be assigned to the same recipients using the same message types, then instead of assigning the routing information for each output separately, the user can assign the routing information for both of the outputs at the same time by selecting both outputs instead of just one output from the list.

At 112, a message based on the output and the message type is created. For example, if the message type received is "text file," then a text file that includes any text from the selected output of the selected job is created. As another example, if the message type received is "e-mail," then an e-mail that includes any text from the selected output of the selected job is created.

At 114, the created message is sent for delivery to the recipient. For example, if the type of message defined in the forwarding parameters is an e-mail, then the e-mail created at 112 is sent to an e-mail program that e-mails the message to the recipient's e-mail address. As another example, if the message type is defined as a popup window, then an instruction is sent for a window to pop up on the recipient device with text from the output. Alternatively, instead of the window popping up automatically, an icon may pop up on the recipient device, and when a person with access to the recipient device selects the icon, the window may pop up.

The method 100 described above allows a person with access to a recipient device to review a specific output of a completed job without having to log onto the mainframe system at all. Instead, the person can review and analyze the output on any device (e.g., a mobile device, laptop, desktop, etc.) without the need for a TPX emulator. Further, the recipients only receive specific outputs from a completed job as opposed to all outputs generated by the job. Therefore, the recipients are not inundated with a flood of messages that they do not need to analyze.

Figure 2:
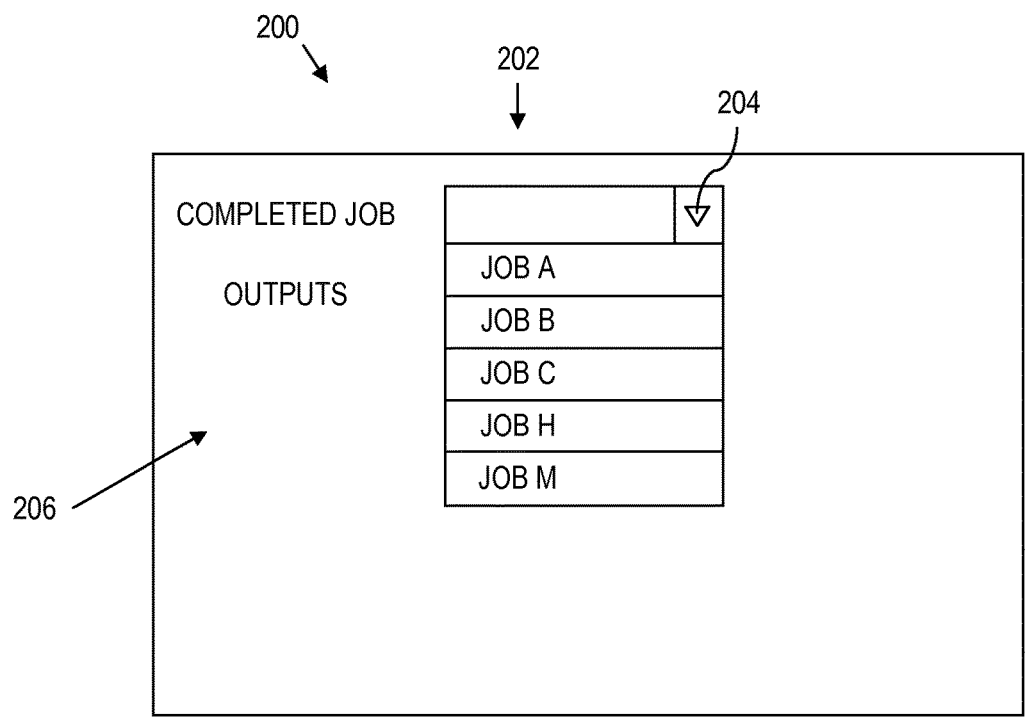
FIG. 2 is an example of a first screen displayed in an example of the method of FIG. 1, according to various aspects of the present disclosure.
Figure 3:
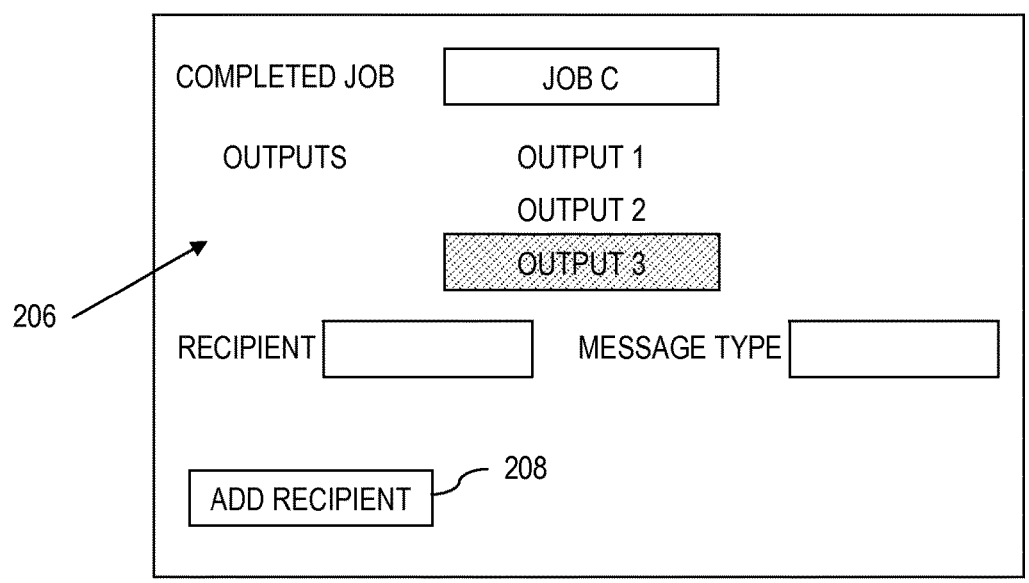
FIG. 3 is an example of a second screen displayed in the example of the method of FIG. 1, according to various aspects of the present disclosure.
Figure 4:
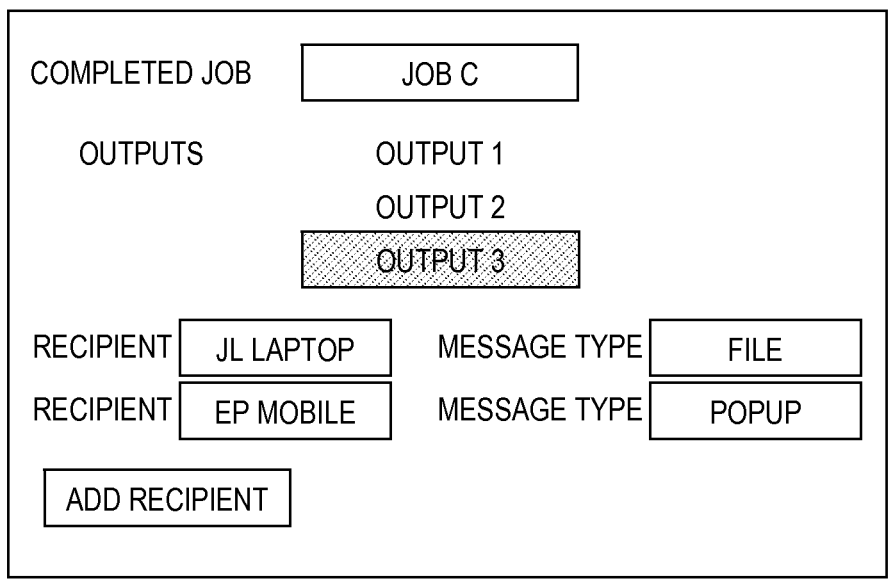
FIG. 4 is an example of a third screen displayed in the example of the method of FIG. 1, according to various aspects of the present disclosure.

FIGS. 2-4 illustrate a non-limiting example of the method 100 of FIG. 1. A user uses a mobile device (e.g., a tablet, a smartphone, etc.) to log onto a system running the method 100 of FIG. 1 independently of a TPX emulator. The system running the method does not necessarily need to be the mainframe system on which the jobs were completed. However, the system running the method should have access to the outputs of the jobs. For example, the system running the method may use an application programming interface (e.g., JZOS API) to access the jobs that were completed on the mainframe.

Once the user logs onto the system running the method, a list of completed jobs is filtered to exclude any jobs not associated with the user, and an interface screen 200 with a dropdown box 202 for completed jobs is displayed. When the user clicks on a down arrow 204 of the dropdown box, the filtered list of completed jobs is displayed. In this example, the list includes several Job Control Language (JCL) jobs: JOB A, JOB B, JOB C, JOB H, and JOB M. As shown, the screen 200 includes an OUTPUTS section 206 (covered by the filtered list of jobs) that will be populated based on the job selected. In other embodiments, the OUTPUT section is not displayed until after the job is selected.

Turning now to FIG. 3, the user selects JOB C via the GUI of the mobile device, and the system running the method transmits the outputs associated with JOB C for display. In this case, JOB C has three outputs: OUTPUT 1, OUTPUT 2, and OUTPUT 3, which are displayed in the OUTPUTS section 206, and the user selects OUTPUT 3. The user then enters forwarding parameters for OUTPUT 3 and adds more recipients via an ADD RECIPIENT button 208. For the forwarding parameters, the embodiment shown includes text-entry boxes for recipients and message type. However, the forwarding parameters may be entered in any way (e.g., dropdown boxes, radio buttons, check boxes, etc.), and the entry method for the recipient does not necessarily need to be the same as the entry method for the message type. For example, the RECIPIENT may be a textbox that includes a dropdown menu, so when the user starts entering the recipient, the dropdown box is filtered to display only recipients associated with those letters. On the other hand, if there are only three types of messages, then all three may be displayed with empty check boxes, and the user can place checks in the boxes of the desired message types for that recipient.

Turning to FIG. 4, the user has entered a first recipient, JL LAPTOP, and a message type, FILE, and added another recipient, EP MOBILE, with a message type of POPUP via the GUI of the mobile device. Thus, a text file is created that includes the text of OUTPUT 3 and is placed on the device associated with JL LAPTOP. In this case, JL LAPTOP is a laptop computer, and the system pushes the created text file to a directory on that laptop. When someone logs onto JL LAPTOP, the text file including the text of OUTPUT is available for viewing. Thus, that person may review and analyze OUTPUT 3 of JOB C without logging onto the mainframe system that ran the JCL job, JOB C.

Also, a popup window populated with information from OUTPUT 3 appears on EP MOBILE, which is a smart phone, and a person with access to EP MOBILE can review and analyze OUTPUT 3 of JOB C without logging onto the mainframe system that ran the JCL job, JOB C.

Figure 5:
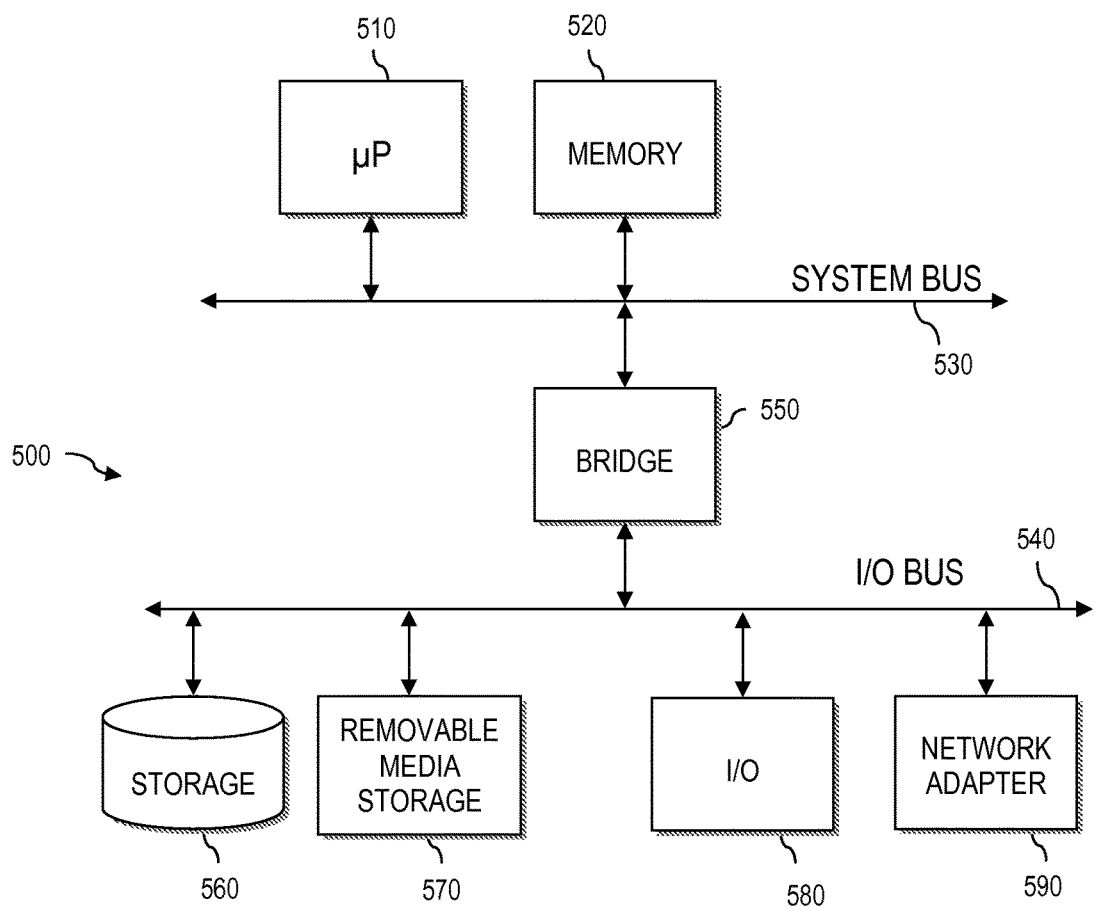
FIG. 5 is a block diagram of a computer system having a computer readable storage medium for implementing functions according to various aspects of the present disclosure as described in greater detail herein.

Referring to FIG. 5, a block diagram of a data processing system is depicted in accordance with the present disclosure. Data processing system 500 may comprise a symmetric multiprocessor (SMP) system or other configuration including a plurality of processors 510 connected to system bus 520. Alternatively, a single processor 510 may be employed. Also connected to system bus 520 is memory controller/cache 530, which provides an interface to local memory 540. An I/O bus bridge 550 is connected to the system bus 520 and provides an interface to an I/O bus 560. The I/O bus may be utilized to support one or more buses and corresponding devices 570, such as bus bridges, input output devices (I/O devices), storage, network adapters, etc. Network adapters may also be coupled to the system to enable the data processing system to become coupled to other data processing systems or remote printers or storage devices through intervening private or public networks.

Also connected to the I/O bus may be devices such as a graphics adapter 580, storage 590 and a computer usable storage medium 595 having computer usable program code embodied thereon. The computer usable program code may be executed to implement any aspect of the present disclosure, for example, to implement any aspect of any of the methods and/or system components illustrated in FIGS. 1-4.

The data processing system depicted in FIG. 5 may comprise, for example, a zSeries mainframe computer, a product of International Business Machines Corporation in Armonk, N.Y., running the Advanced Interactive Executive (AIX) operating system. An object oriented programming system such as Java may run in conjunction with the operating system and provides calls to the operating system from Java programs or applications executing on data processing system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), Flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device, but does not include propagating signals.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A method comprising:
   receiving, at a mainframe system via a terminal productivity executive (TPX) emulator interface, a plurality of jobs for completion by the mainframe system;
   completing, at the mainframe system, the plurality of jobs and storing outputs generated by the jobs;
   storing, at the mainframe system, a list of completed jobs that were completed on the mainframe system, wherein each completed job is associated with a list of outputs;
   receiving, at the mainframe system, a log on request from a device of a user-without using the TPX emulator interface, wherein the device of the user is remote to the mainframe system;
   causing a portion of the list of completed jobs to be displayed on a graphic user interface (GUI) associated with the device of the user;
   receiving, from the device of the user, a selection of a job from the list of jobs;
   causing the list of outputs associated with the selected job to be displayed on the GUI associated with the device of the user;
   receiving, from the device of the user, a selection of an output from the list of outputs;
   receiving, from the device of the user, forwarding parameters associated with the selected output, wherein the forwarding parameters include a recipient and a message type;
   creating a message based on the selected output and the message type identified in the forwarding parameters; and
   causing the message to be sent to the recipient such that the recipient can receive the message without logging onto the mainframe system.

2. The method of claim 1 further comprising:
   receiving an identification of the user; and
   filtering the list of completed jobs based on the user.

3. The method of claim 1, wherein:
   receiving, from the device of the user, a selection of a job from the list of jobs further comprises receiving the selection of the job via the graphical user interface;
   receiving, from the device of the user, a selection of an output from the list of outputs further comprises receiving the selection of the output via the graphical user interface; and
   receiving, from the device of the user, forwarding parameters associated with the selected output further comprises receiving the forwarding parameters via the graphical user interface.

4. The method of claim 1, wherein:
   receiving, from the device of the user, forwarding parameters associated with the selected output further comprises receiving the forwarding parameters, wherein the forwarding parameters further include a list of recipients associated with the selected output; and
   causing the message to be sent to the recipient further comprises causing the message to be sent to devices associated with the recipients identified in the list of recipients.

5. The method of claim 1, wherein:
   receiving, from the device of the user, forwarding parameters associated with the selected output further comprises receiving the forwarding parameters, wherein the forwarding parameters further include a list of message types associated with the selected output;
   creating a message based on the selected output and the message type identified in the forwarding parameters further comprises creating a message for each type of message identified in the forwarding parameters; and
   causing the message to be sent to the recipient further comprises causing the message to be sent to a device associated with the recipient.

6. The method of claim 1, wherein:
   causing a portion of the list of completed jobs be displayed on a graphic user interface associated with the device of the user further comprises transmitting a list of job-control-language (JCL) jobs completed on the mainframe system; and
   creating a message based on the selected output and the message type identified in the forwarding parameters further comprises creating the message for display independent of the mainframe system.

7. The method of claim 1, wherein the device of the user is a mobile device.

8. The method of claim 1, wherein:
   receiving, from the device of the user, forwarding parameters associated with the selected output further comprises receiving forwarding parameters, wherein the message type is a popup window; and
   causing the message to be sent to the recipient further comprises creating a popup window on a client associated with the recipient, wherein the popup window is populated with information from the selected output.

9. The method of claim 1, wherein:
receiving, from the user, forwarding parameters associated with the selected output further comprises receiving forwarding parameters, wherein the message type is an e-mail;
creating a message based on the selected output and the message type identified in the forwarding parameters further comprises creating an e-mail populated with information from the output; and
causing the message to be sent to the recipient further comprises sending the e-mail to an e-mail address associated with the recipient.

10. The method of claim 1, wherein:
receiving, from the user, forwarding parameters associated with the selected output further comprises receiving forwarding parameters, wherein the message type is a text file;
creating a message based on the selected output and the message type identified in the forwarding parameters further comprises creating a text file populated with information from the output; and
causing the message to be sent to the recipient further comprises pushing the text file to a client device associated with the recipient.

11. A mainframe system comprising a hardware processor coupled to memory, wherein the processor is programmed to perform operations comprising:
receiving, at the mainframe system via a terminal productivity executive (TPX) emulator interface, a plurality of jobs for completion by the mainframe system;
completing, at the mainframe system, the plurality of jobs and storing outputs generated by the jobs;
storing, at the mainframe system, a list of completed jobs that were completed on the mainframe system, wherein each completed job is associated with a list of outputs;
receiving, at the mainframe system, a log on request from a device of a user without using the TPX emulator interface, wherein the device of the user is remote to the mainframe system;
causing a portion of the list of completed jobs to be displayed on a graphic user interface (GUI) associated with the device of the user;
receiving, from the device of the user, a selection of a job from the list of jobs;
causing the list of outputs associated with the selected job to be displayed on the GUI associated with the device of the user;
receiving, from the device of the user, a selection of an output from the list of outputs;
receiving, from the device of the user, forwarding parameters associated with the selected output, wherein the forwarding parameters include a recipient and a message type;
creating a message based on the selected output and the message type identified in the forwarding parameters; and
causing the message to be sent to the recipient such that the recipient can receive the message without logging onto the mainframe system.

12. The system of claim 11, wherein the processor is further programmed to perform operations comprising:
receiving an identification of the user; and
filtering the list of completed jobs based on the user.

13. The system of claim 11, wherein:
receiving, from the device of the user, forwarding parameters associated with the selected output further comprises receiving the forwarding parameters, wherein the forwarding parameters further include a list of recipients associated with the selected output; and
causing the message to be sent to the recipient further comprises causing the message to be sent to devices associated with the recipients identified in the list of recipients.

14. The system of claim 11, wherein:
receiving, from the device of the user, forwarding parameters associated with the selected output further comprises receiving the forwarding parameters, wherein the forwarding parameters further include a list of message types associated with the selected output;
creating a message based on the selected output and the message type identified in the forwarding parameters further comprises creating a message for each type of message identified in the forwarding parameters; and
causing the message to be sent to the recipient further comprises causing the message to be sent to a device associated with the recipient.

15. The system of claim 11, wherein:
causing a portion of the list of completed jobs be displayed on a graphic user interface associated with the device of the user further comprises transmitting a list of job-control-language (JCL) jobs completed on the mainframe system; and
creating a message based on the selected output and the message type identified in the forwarding parameters further comprises creating the message for display independent of the mainframe system.

16. The system of claim 11, wherein the device of the user is a mobile device.

17. The system of claim 11, wherein:
receiving, from the device of the user, forwarding parameters associated with the selected output further comprises receiving forwarding parameters, wherein the message type is a popup window; and
causing the message to be sent to the recipient further comprises creating a popup window on a client associated with the recipient, wherein the popup window is populated with information from the selected output.

18. The system of claim 11, wherein:
receiving, from the user, forwarding parameters associated with the selected output further comprises receiving forwarding parameters, wherein the message type is an e-mail;
creating a message based on the selected output and the message type identified in the forwarding parameters further comprises creating an e-mail populated with information from the output; and
causing the message to be sent to the recipient further comprises sending the e-mail to an e-mail address associated with the recipient.

19. The system of claim 11, wherein:
receiving, from the user, forwarding parameters associated with the selected output further comprises receiving forwarding parameters, wherein the message type is a text file;
creating a message based on the selected output and the message type identified in the forwarding parameters further comprises creating a text file populated with information from the output; and
causing the message to be sent to the recipient further comprises pushing the text file to a client device associated with the recipient.

20. A non-transitory, computer-readable medium storing instructions that when executed by a mainframe system cause the mainframe system to perform operations comprising:
- receiving, at the mainframe system via a terminal productivity executive (TPX) emulator interface, a plurality of jobs for completion by the mainframe system;
- completing, at the mainframe system, the plurality of jobs and storing outputs generated by the jobs;
- storing, at the mainframe system, a list of completed jobs that were completed on the mainframe system, wherein each completed job is associated with a list of outputs;
- receiving, at the mainframe system, a log on request from a device of a user without using the TPX emulator interface, wherein the device of the user is remote to the mainframe system;
- causing a portion of the list of completed jobs to be displayed on a graphic user interface (GUI) associated with the device of the user;
- receiving, from the device of the user, a selection of a job from the list of jobs;
- causing the list of outputs associated with the selected job to be displayed on the GUI associated with the device of the user;
- receiving, from the device of the user, a selection of an output from the list of outputs;
- receiving, from the device of the user, forwarding parameters associated with the selected output, wherein the forwarding parameters include a recipient and a message type;
- creating a message based on the selected output and the message type identified in the forwarding parameters; and
- causing the message to be sent to the recipient such that the recipient can receive the message without logging onto the mainframe system.

* * * * *